(12) United States Patent
Goldwasser et al.

(10) Patent No.: US 8,762,736 B1
(45) Date of Patent: Jun. 24, 2014

(54) ONE-TIME PROGRAMS

(75) Inventors: Shafi Goldwasser, Cambridge, MA (US); Yael Tauman Kalai, Cambridge, MA (US); Guy Nathanel Rothblum, Cambridge, MA (US)

(73) Assignee: Massachusetts Institute of Technology, Cambriged, MA (US)

( * ) Notice: Subject to any disclaimer, the term of this patent is extended or adjusted under 35 U.S.C. 154(b) by 1243 days.

(21) Appl. No.: 12/417,152

(22) Filed: Apr. 2, 2009

Related U.S. Application Data

(60) Provisional application No. 61/042,353, filed on Apr. 4, 2008, provisional application No. 61/146,830, filed on Jan. 23, 2009.

(51) Int. Cl.
| | |
|---|---|
| *G06F 11/30* | (2006.01) |
| *G06F 12/14* | (2006.01) |
| *G06F 7/04* | (2006.01) |
| *H04N 7/16* | (2011.01) |
| *G06K 5/00* | (2006.01) |

(52) U.S. Cl.
USPC ........... 713/189; 713/182; 713/185; 713/190; 726/26; 726/27; 726/30; 726/31; 235/375; 235/380; 235/382

(58) Field of Classification Search
USPC ......... 726/2, 3, 4, 5, 9, 16, 17, 20, 27, 29, 30, 726/31; 713/182, 184, 185, 189, 190; 235/375, 380, 382, 382.5
See application file for complete search history.

(56) References Cited

U.S. PATENT DOCUMENTS

| | | | | |
|---|---|---|---|---|
| 6,834,272 | B1 * | 12/2004 | Naor et al. ..................... | 705/80 |
| 6,857,067 | B2 * | 2/2005 | Edelman ....................... | 713/155 |
| 6,904,527 | B1 * | 6/2005 | Parlour et al. ................. | 713/189 |
| 2002/0040936 | A1 * | 4/2002 | Wentker et al. ............... | 235/492 |
| 2002/0178371 | A1 * | 11/2002 | Kaminaga et al. ............ | 713/189 |
| 2005/0033983 | A1 * | 2/2005 | Takekawa et al. ............ | 713/200 |
| 2005/0038724 | A1 * | 2/2005 | Roever et al. ................. | 705/35 |
| 2005/0218234 | A1 * | 10/2005 | Girard et al. .................. | 235/492 |
| 2005/0234860 | A1 * | 10/2005 | Roever et al. ................. | 707/1 |
| 2008/0137861 | A1 * | 6/2008 | Lindmo et al. ............... | 380/270 |

* cited by examiner

*Primary Examiner* — Tae Kim
(74) *Attorney, Agent, or Firm* — Anderson Gorecki & Rouille LLP

(57) ABSTRACT

A method, apparatus and computer program product for providing one-time programs is presented. A program to be converted to a new program having a predetermined lifetime is identified. The program is compiled to produce the new program having a predetermined lifetime and wherein the new program having a predetermined lifetime is guaranteed to only have the predetermined lifetime.

51 Claims, 4 Drawing Sheets

ONE-TIME PROGRAMS

CROSS REFERENCE TO RELATED APPLICATIONS

The present application claims the benefit of U.S. Provisional Patent Application No. 61/042,353, filed on Apr. 4, 2008, and U.S. Provisional Patent Application No. 61/146,830, filed on Jan. 23, 2009, both of which are incorporated herein by reference in their entirety.

GOVERNMENT GRANT

This invention was made with government support under grant numbers CNS0430450, CCF0635297, CCF0514167, and CCF0729011 awarded by the National Science Foundation. The government has certain rights in this invention.

BACKGROUND

An inherent property of digital programs (e.g. computer programs, circuits etc.) is that a user can run a single digital program on any number of inputs, computing all the outputs that the user desires. This property is inherent, because once a user is given the code of a program, he can use it as many times as he wishes, copy it, distribute it, etc. The user can always make copies of the program he receives, and run each of them on different inputs. Furthermore, even if some software protection mechanism is built into the program, there is no known method to guarantee that the code cannot be reverse engineered or that the protection cannot be removed. Once the software protection is removed, the user can run the program on any input of his or her choice.

SUMMARY

Conventional mechanisms such as those explained above suffer from a variety of deficiencies. One such deficiency is that in many applications a vendor would only like to give a user limited access to a program. Specifically, the vendor may want to limit the number of times that a user can run the program. In a standard computing world (and the standard theoretical computing models), computer programs can be copied, analyzed, modified, and executed in an arbitrary manner. However, when one thinks of security applications, such complete transfer of code is often undesirable, as it complicates and inhibits tasks such as revocation of cryptographic ability, temporary transfer of cryptographic ability, and preventing double spending of electronic cash. Other tasks such as general program obfuscation may be downright impossible.

Embodiments of the invention significantly overcome such deficiencies and provide mechanisms and techniques that provide programs that will be one-time or k-time, where the user will only be able to run the program once (or, respectively, k times). Throughout the description the terms "one time program" and "a program having a predetermined lifetime" are used interchangeably and refer to a program which is usable either one time or k amount of times.

A one-time program can be executed on a single input, whose value can be specified at run time. Other than the result of the computation on this input, nothing else about the program is leaked. Hence, a one-time program is like a black box function that may be evaluated once and then "self destructs." This also extends to k-time programs, which are like black box functions that can be evaluated k times and then self-destruct.

One-time programs serve many of the same purposes of program obfuscation, such as software protection, but also including applications such as temporary transfer of cryptographic ability. Moreover, the applications of one-time programs go well beyond those of obfuscation, since one-time programs can only be executed once (or more generally, a limited number of times) while obfuscated programs have no such bounds. For example, one-time programs lead naturally to electronic cash or token schemes: coins are generated by a program that can only be run once, and thus cannot be double spent.

Most significantly, the new paradigm of one-time computing opens new avenues for conceptual research. One such concept is the concept of "one-time proofs," proofs that can only be verified once and then become useless and unconvincing.

All these tasks may be impossible using software alone, as any piece of software can be copied and run again, enabling the user to execute the program on more than one input. Embodiments of the present invention employ a secure memory device, inspired by the cryptographic notion of interactive oblivious transfer protocols, that stores two secret keys ($k_0$, $k_1$). The device takes as input a single bit $b \in \{0, 1\}$, outputs $k_b$, and then self-destructs. Using such devices, it can be demonstrated that for every input length, any standard program (Turing machine) can be efficiently compiled into a functionally equivalent one-time program. Also described is how this memory device can be used to construct one-time proofs. Specifically, this device can be utilized to efficiently convert a classical witness for any NP statement, into "one-time proof" for that statement.

In a particular embodiment of a method for providing one-time programs, the method includes identifying a program to be converted to a new program having a predetermined lifetime. The method also includes compiling the program to produce the new program having a predetermined lifetime and wherein the new program having a predetermined lifetime is guaranteed to only have the predetermined lifetime.

Other embodiments include a computer readable medium having computer readable code thereon for providing one-time programs. The computer readable medium includes instructions for identifying a program to be converted to a new program having a predetermined lifetime. The computer readable medium also includes instructions for includes compiling the program to produce the new program having a predetermined lifetime and wherein the new program having a predetermined lifetime is guaranteed to only have the predetermined lifetime.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides a program having a predetermined lifetime as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing a program having a predetermined lifetime as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
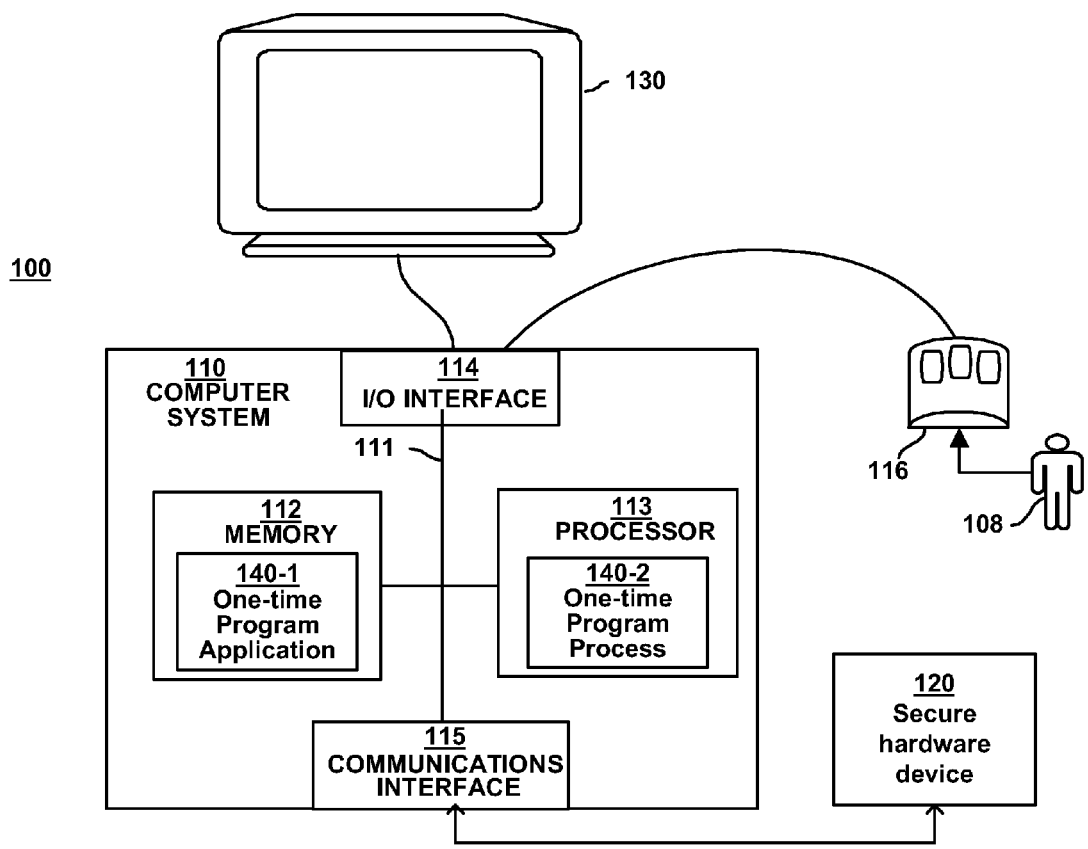
FIG. 1 illustrates an example computer system architecture for a computer system that provides a program having a predetermined lifetime in accordance with embodiments of the invention.

The concept of a new type of computer program, called a one-time program is presented. Such programs can be executed only once, where the input can be chosen at any time. This notion extends naturally to k-time programs which can be executed at most k times on inputs that can be chosen by the user at any time. These programs have immediate applications to software protection, electronic tokens and electronic cash. Even more interestingly, they open new avenues for conceptual contributions. In particular, embodiments of the present invention permit the user to conceive of, define and realize the new cryptographic concept of one-time zero-knowledge proofs: zero-knowledge proofs that can be verified exactly once, by any verifier, without the prover being present. After the proof is verified once by any single verifier, it becomes useless and cannot be verified again.

Clearly a one-time program cannot be solely software based, as software can always be copied and run again, enabling a user to execute the program more times than specified. Instead, embodiments of the present invention incorporate the use of a secure memory devices, one-time memory (OTM), as part of the onetime program. In general, when using a hardware device it is crucial that the device be as simple as possible, so that it can be scrutinized more easily. In particular, side-channel attacks have emerged as a devastating threat to the security of hardware devices. The memory device used in this work is very simple and withstands even extremely powerful side-channel attacks. An OTM does not perform any computation, but its memory contents are assumed to be somewhat protected, i.e. they cannot be read and written arbitrarily. It is understood that memory locations that are never accessed by the device are never leaked via a side channel (whereas memory that is accessed may be immediately leaked), and that the device has a single tamper-proof bit. In particular, the OTM device meets can be decoupled into two components: the first component is tamper-proof but readable, and consists of a single bit. The second component is tamperable but read-proof. As mentioned above, in our case the read-proof requirement is only for memory locations that are never accessed by the device. These assumptions seem minimal if any non-trivial use is to be made of the secure device. Also, the device is very inexpensive, low energy and disposable, much like RFID tags used in clothing. Thus, a one-time program can be realized by a combination of standard software and such minimally secure memory devices.

The notion of one-time programs extends naturally to k-time programs which can be provably executed at most k times on input values that can be chosen by the user at any time. For simplicity of exposition the present application uses examples with the one-time case though it should be appreciated that the same or similar concepts apply to programs having a limited time (k) of use.

As previously mentioned, a one-time program cannot be solely software based, and secure hardware devices are used as building blocks in the constructions. In general, secure hardware devices are modeled as black boxes with internal memory which can be accessed only via its I/O interface. A one-time program is a combination of hardware: (one or many) hardware devices 'H$_1$, . . . , 'H$_m$; and software: a (possibly nonuniform) Turing machine M, where the machine M accesses the hardware devices via their I/O interface. It is important to note that the Turing machine software component is not secure: it can be read and modified by the user whereas the access to the secure hardware is only via the I/O interface. Thus, we view one-time programs as software-hardware packages. An execution of one-time program $P=M'^{H1,\ldots,'Hm}$ on input $x \in \{0,1\}^n$, is a run of $M'^{H1,\ldots,'Hm}(x)$, where the contents of M's output tape is the output. Throughout this work w a new type of secure hardware device is used which is referred to as a one-time memory (OTM).

Also presented is a universal one-time compiler that takes any standard polynomial-time program and memory devices as above, and transforms it (in polynomial time) into a one-time program which achieves the same functionality, under the assumption that one-way functions exist. This compiler uses techniques from secure function evaluation, specifically Yao's garbled circuit method, as its starting point. These techniques, however, only give solutions for settings in which adversaries are honest-but-curious, whereas it is desirable for the security of one-time programs to also hold against malicious adversaries. Unlike the setting of secure function evaluation, this difficulty is overcome without the benefit of interaction. This is accomplished (non-interactively) using the secure memory devices.

While it is not shown that this compiler is optimal in terms of the efficiency of the one-time programs it produces, it still provides significant improvements which would resolve a central open problem in cryptography. Specifically, significant complexity improvements would imply significant improvements in the communication complexity of secure function-evaluation protocols.

To transform a standard computer program into a one-time program computing the same functionality, the notion of a one-time compiler is described. The compiler takes a computer program, modeled as a (possibly non-uniform) Turing machine T, an input length n, and a collection of OTM devices (the number of devices may depend on n). The compiler then creates a one-time program computing the same functionality as T on inputs of length n by initializing the internal memory of the OTMs and also outputting (in the clear) a software component for the program. It is also important that the compiler be efficient, in the sense that its running time is no worse than polynomial in T's worst-case running time on inputs of length n.

In this work a one-time compiler is constructed as above. The compiler transforms any Turing machine T into a one-time program P that satisfies the two intuitive properties (functionality and one-time secrecy) outlined above. Regarding functionality, for any $x \in \{0, 1\}^n$, when the program is run once on input x it outputs T (x); namely, $P(x)=T(x)$. Regarding one-time Secrecy, for any PPT adversary A, there exists a PPT simulator S with one-time oracle access to the machine T. The simulator gets the machine's output, running time and space usage on a single input of its choice, and its running time is polynomial in the machine T's worst-case running time (and in n). For any machine T the following two distributions are indistinguishable. First, the output of the adversary A when it is run with arbitrary access to the one-time program P (i.e. full access to the software component and black-box access to the hardware component). Second, the output of the simulator with one-time oracle access to T.

Moreover, the indistinguishability holds even for a distinguisher who takes T as input. Note that it is crucial that the simulator S only accesses its oracle once. Also note that the simulator cannot access any part of the actual one-time program, including the hardware, not even in a black-box manner.

A one-time-memory (OTM) is a memory device initialized with two keys $(k_0, k_1)$. It takes as input a single bit $b \in \{0, 1\}$, outputs $k_b$ and "self destructs". There are several ways to formalize the concept of self-destruction. The first would be to erase both keys after outputting $k_b$. However, to circumvent side-channel attacks, it is preferable that the device never access the key not retrieved. Instead, the following formalism is chosen.

An OTM is initialized with two keys $(k_0, k_1)$, and one additional tamperproof bit set to 0. The OTM input is a single bit $b \in \{0, 1\}$. Upon receiving an input, the OTM verifies that the tamper-proof bit is set to 0, sets it to 1 and outputs $k_b$. If the tamper-proof bit is not 0, the device outputs an error symbol $\perp$. Thus, an OTM outputs one of its two keys, and the other key is irretrievably lost (and never accessed).

Security assumptions from the OTM device are quite minimal. The memory locations that are never accessed by the device are never leaked via a side channel, whereas a memory cell that is accessed may be immediately leaked. The single bit b is tamper-proof (but is readable). Intuitively, the above two assumptions imply that the device is as secure as a black box.

OTM's are inspired by the cryptographic notion of one out of two oblivious transfer, where a sender holds two keys and lets a receiver receive one of them. The key not chosen is irrevocably lost, and the sender does not learn (is oblivious to) which key the receiver received. Whereas an oblivious transfer is an interactive protocol, an OTM is a physical device. The important requirement from an OTM is that the user using the device (analogous to the "receiver" in an oblivious transfer protocol) learns only the secret of his choice. The requirement that the key generator (analogous to the "sender") is oblivious and does not learn which secret the user received, makes little sense in this setting as the OTM is at the hands of the "receiver" and the key generator is no longer present at the time that the OTM is used.

This guarantees that the one-time program cannot be duplicated and run more than once. The simulator certainly cannot duplicate, and thus an adversary who can obtain two of the program's outputs cannot be simulated.

There are many possible secure hardware devices one could conceive of using, and it is not a-priori clear whether one device is better or worse than another. This is a central question in the study of one-time programs, and secure hardware in general.

A trivial solution would be to build for each function $f$ a special-purpose task-specific secure hardware device which computes $f$ for one input x and then refuses to work any longer. This solution is highly unsatisfactory, for several reasons. First, this approach calls for building a different hardware device for each different function $f$. This may be worthwhile for some tasks, but is too costly for most tasks and thus infeasible in practice. Instead, it is advocated that the secure hardware device of choice should be universal. Namely, that the hardware device be task-independent, and "programmable" so it can be used to construct a one-time program for any functionality (one-time programs for different functions will differ in their software component). In the case of secure hardware (rather than ordinary hardware), universality is particularly important, as each type of hardware device needs to be intensely scrutinized to try to guarantee that it is not susceptible to side channel attacks. This seems impossible to do on a function-by-function basis.

Second, perhaps the most central measure of reasonability for a secure hardware device is its simplicity, and the trivial solution suggested above is potentially complex as it requires producing complex hardware for complex functions. Our search for simple hardware devices, which are easy to build, analyze and understand, is motivated by several concerns. The assumption that a hardware device is secure and/or tamper-proof is a very strong assumption, as one has to consider all possible physical attacks. The simpler a hardware device is, the easier it is to scrutinize and analyze its security, and the more reasonable the assumption that it is secure becomes. Continuing in this vein, side channel attacks have emerged as a significant threat to the integrity of cryptographic algorithms and devices. It seems intuitive that the less computation the hardware performs, the less susceptible it will be to potentially devastating side-channel attacks.

Indeed, this is the guiding principle behind the theoretical approach to defining physically secure devices taken by others. In the case of task-specific hardware, ad absurdum the entire the computation can be done by the hardware. Finally, and perhaps most obviously, the simpler a hardware device is, the easier and cheaper to build it will be.

An alternate solution would be to use the physically shielded full-blown CPU. This CPU contains a protected ROM (read only memory) unit in which a secret decryption key is written. The I/O access to the shielded CPU is through fetch instructions. In each computation cycle, the CPU fetches an encrypted instruction, decrypts it, and executes it. The hardware security assumption here is that both the cryptographic operations (decryption, encryption etc.), as well as the general-purpose computation operations, are perfectly shielded. Each such shielded CPU was associated with a different decryption key, and the encrypted software executed on it was to be encrypted with the matching encryption key. Others have envisioned protecting a software program by encrypting it and packaging it with a physically shielded CPU with a matching decryption key. One-time programs can be easily built in the same manner (adding a counter to the CPU to limit the number of executions).

This solution is certainly universal, as the CPU can compute all tasks. Yet, it is not believed that it is suitable for the one-time programs application. A full blown protected CPU is far from the goal of hardware simplicity, and so complex as to make the approach unviable for the design of one-time programs. This is evidenced by the simple fact that although these devices were first proposed in the early 1980's, they still seem beyond the reach of current day technology in terms of cost. It seems that in particular for the application of one-time programs, using a full-blown shielded CPU for computing one task a limited number of times is overkill.

Secure CPUs perform complex computations (both cryptographic and otherwise), and are thus susceptible to side channel attacks. If it is assumed, when modeling side channel attacks, that each computational step may leak information about bits accessed by the hardware, the device becomes especially vulnerable: once the secret key (which is used in every step of the computation) leaks, the security of the entire construction falls apart.

Now, the use of OTMs is re-examined in light of the above alternative suggestions. OTMs are universal task-independent devices that can be used to make any program one-time. Moreover, an OTM is also a simple device. Most importantly, even if it is assumed that side-channel adversaries can capture every bit accessed by the hardware during a computation step, the OTM construction remains secure, as long as there is a single (readable) tamper-proof bit. The OTM key that is not chosen is never accessed, and thus OTM constructions are secure under the assumption that untouched memory bits are not leaked.

So far, the comparison between OTM and other secure hardware was qualitative. Presented now are some several quantitative complexity measures for analyzing secure hardware devices and their use by a one-time program.

Hardware Runtime refers to the total combined running time of all the hardware devices used by the one-time program. This measures the amount of computation done by the secure hardware devices (e.g. number of operations done by their CPU), and not the amount of computation done by the one-time program's software component. Clearly, it is desirable for the hardware to do as little work as possible, both because simple devices will be computationally much weaker than the CPU of a modern personal computer and because the more computation is done on a device the more susceptible it may become to side-channel attacks. Also considered is the total runtime of the one-time program, which is the combined runtime of the hardware and software components.

The term "size" refers to the combined sizes of all the hardware devices used by the onetime program. The size of a hardware device is the size of its (persistent) memory together with the size of its control program. The smaller the hardware device, the better, as protecting smaller memories are easier.

Latency refers to the number of times the one-time program P accesses its secure hardware devices. Assuming that each time hardware devices are accessed, many of them may be queried in parallel, but wanting to minimize the number of (adaptive) accesses to the hardware devices, both to guarantee that the hardware is not involved in complex computations and to optimize performance (as accessing hardware is expensive).

Building on the ideas in Yao's Garbled-Circuit construction, it can be demonstrated that a universal one-time compiler exists using OTMs. First, convert the input (Turing machine) program into a Boolean circuit on inputs of length n. Second, garble it using Yao's method. And, finally, use n OTM's to transform the garbled circuit into a one-time program. We encounter an obstacle in this last step, as the security of Yao's construction is only against honest-but-curious adversaries, whereas the one-time program needs to be secure against any malicious adversary. In the secure function evaluation setting this is resolved using interaction (e.g. via zero-knowledge proofs), or using some global setup and non-interactive zero-knowledge proofs. The setting of one-time programs, however, is not an interactive setting, and these solutions cannot be used. Instead, a solution to this problem is presented that uses the OTM devices.

Informal Theorem 1: Assume that one-way functions exist. There exists an efficient one-time compiler C that for input length n uses n OTMs: $B_1, \ldots, B_n$. For any (non-uniform) Turing machine T, with worstcase running time $t_T(n)$ (on inputs of length n), the compiler C, on input $1^n$, $1^{t_T(n)}$, description of T and security parameter $1^{\kappa(n)}$, outputs a onetime program $P\Delta M^{B_1(v_1), \ldots, B_n(v_n)}$ such that $P(x)=T(x)$ for inputs of length n. Let $t_T(x)$ denote T's running time on input $x \in \{0, 1\}^n$. Then, P(x) achieves: latency 1; hardware runtime $n \cdot \kappa(n)$; total running time $\tilde{O}(t_T(x) \cdot poly(\kappa, n))$; and size $\tilde{O}(t_T(n) \cdot poly(\kappa))$.

The proof is shown by briefly reviewing Yao's Garbled Circuit construction. It is assumed (for the sake of simplicity) that the underlying Turing machine has a Boolean (1 bit) output, but the construction is easily generalized to multi-bit outputs while maintaining the performance claimed in the theorem statement. The construction proceeds by converting the Turing machine T into a Boolean circuit of size $\tilde{O}(t_T(n)$ and then garbling it using Yao's garbled circuit method. This gives a garbled circuit G(T) of size $\tilde{O}(t_T(n) \cdot poly(k))$, together with n key-pairs $k_1^0, k_1^1) \ldots (k_n^0, k_n^1)$. The construction guarantees both. There is an efficient algorithm that for any input $x \in \{0, 1\}^n$ takes as input G(T) and only the n keys $k_1^{x_1}, \ldots k_n^{x_n}$ (one from each pair of keys), and outputs T(x). The algorithm's running time is $\tilde{O}(t_T(x) \cdot poly(k))$. The construction also guarantees privacy wherein an adversary cannot learn more from the garbled circuit together with one key out of each key-pair, say the $x_i$-th key from the i-th key pair, than the output of the machine on the input $x=x_1 \circ \ldots \circ x_n$. Formally, there exists an efficient simulator S such that for any machine T, for any output value b and for any input x such that C(x)=b, the simulator's output on input (b, x, $1^{T(n)}$, $1^\kappa$) is indistinguishable from (x, G(T), $k_1^{x_1}, \ldots, k_n^{x_n}$).

Yao's garbled circuit can be used to build one-time programs using OTMs. A deceptively straightforward idea for a one-time compiler is to use n OTMs: garble the machine T, and put the i-th key pair in the i-th OTM. To compute T's output on an input x a user can retrieve the proper key from each OTM and use the correctness of the garbled circuit construction to get the machine's output. Privacy may seem to follow from the privacy of the garbled circuit construction. Surprisingly, however, the above construction does not seem to guarantee privacy. In fact, it hides a subtle but inherent difficulty.

The difficulty is that the privacy guarantee given by the garbled circuit construction is too weak. At a higher level this is because the standard Yao construction is in the honest-but-curious setting, whereas we want to build a program that is one-time even against malicious adversaries. More concretely, the garbled circuit simulator generates a dummy garbled circuit after the input x is specified, i.e. only after it knows the circuit's output T(x). This suffices for honest-but-curious two-party computation, but it is not sufficient for others. The (malicious) one-time program adversary may be adaptive in its choice of x: the choice of x could depend on the garbling itself, as well as the keys revealed as the adversary accesses the OTMs. This poses a problem, as the simulator, who wants to generate a dummy garbling and then run the adversary on it, does not know in advance on which input the adversary will choose to evaluate the garbled circuit. On closer examination, the main problem is that the simulator does not know in advance the circuit's output on the input the adversary will choose, and thus it does not know what the dummy garbling's output should be. Note that we are not in an interactive setting, and thus we cannot use standard solutions such as having the adversary commit to its input x before seeing the garbled circuit.

To overcome this difficulty, the naive construction that was obtained directly from the garbled circuit is changed to give the simulator more power. The objective is allowing the simulator to "hold off" choosing the output of the dummy garbling until the adversary has specified the input. This is done by "hiding" a random secret bit $b_i$ in the i-th OTM, this bit is exposed no matter which secret the adversary requests. These n bits mask (via an XOR) the circuit's output, giving the simulator the flexibility to hold off "committing" to the unmasked garbled circuit's output until the adversary has completely specified its input x (by accessing all n of the OTMs). The simulator outputs a garbled dummy circuit that evaluates to some random value, runs the adversary, and once the adversary has completely specified x by accessing all n OTMs, the simulator can retrieve T(x) (via its one-time T-oracle), and the last masking bit it exposes to the adversary (in the last OTM the adversary accesses) always unmasks the garbled dummy circuit's output to be equal to T(x).

Note that in the prior art scheme, both the hardware runtime and the latency is the same as the entire running time of the program, whereas in the presently described scheme (using OTMs) the latency is 1 and the hardware runtime is n·κ(n) (independent of the program runtime). On the other hand, one advantage of the prior art scheme is that the size of the entire one-time program is proportional to the size of a single cryptographic key (independent of the program runtime), whereas in the present scheme the size is quasi-linear in the (worst-case) runtime of the program.

The primary disadvantage of this construction is the size of the one-time program. The "garbled circuit" part of the program (the software part) is as large as the (worst-case) running time of the original program. It is natural to ask whether this is inherent. In fact, it is not, as one-time programs based on the Goldreich-Ostrovsky construction (with a counter limiting the number of executions) have size only proportional to the size of the original program and a cryptographic key. However, as discussed above, the Goldreich-Ostrovsky solution requires complex secure hardware that runs the entire computation of the one-time program.

It remains to ask, then, whether it is possible to construct one-time programs that enjoy "the best of both worlds." I.e. to build small one-time programs with simple hardware that does very little work. This is a fundamental question in the study of one-time programs. Unfortunately, it can be shown that building a one-time program that enjoys the best of both worlds (small size and hardware running time) is beyond the reach of current knowledge in the field of cryptography. This is done by showing that such a construction would resolve a central open problem in foundational cryptography: it would give a secure-function-evaluation protocols with sub-linear (in the computation size) communication complexity.

Continuing in the spirit of one-time computing, also defined and constructed are one-time proofs. A one-time proof system for an N P language L allows the owner of a witness for the membership of some input x in L to transform this witness into a one-time proof token (a device with the above secure memory components). This proof token can be given to any efficient prover, who does not know a witness for x. The prover can use this token exactly once to prove to any verifier that x∈L using an interactive proof. The prover does not learn anything from the proof token, and in particular cannot prove that x∈L a second time. The witness owner does not need to be involved in the interaction between the prover and verifier. Also shown is a method regarding how to construct a one-time proof system with negligible soundness for any N P language. Achieving constant soundness is relatively straightforward, but amplifying the soundness is not. The technical difficulties are similar to those encountered in parallel composition of zero-knowledge proofs. These difficulties are resolved (again, in a non-interactive manner) using the secure memory devices.

Informally, a one-time program for a function $f$ can be used to compute $f$ on a single input x of one's choice. No efficient adversary, given the one-time program, can learn more about $f$ than can be learned from a single pair (x, $f$(x)), where x is chosen by the adversary. Hence, it acts like a black-box function that can only be evaluated once.

Several formal definitions can be proposed for the above condition. Informally, for every probabilistic polynomial time algorithm A given access to a one-time program for $f$ on inputs of size n, there exists another probabilistic polynomial time algorithm $S(1^n)$ which can request to see the value $f$(x) for an x of its choice where |x|=n, such that (for any $f$) the output distributions of A and S are computationally indistinguishable, even to a machine that knows $f$.

A one-time proof system for an NP language L consists of three entities: (i) a witness owner who has a witness to the membership of some element x in a language L, (ii) a prover, and (iii) a verifier, where the prover and verifier know the input x but do not know the witness to x's membership in L. A one-time proof system allows the witness owner to (efficiently) transform its N P witness into a hardware based proof token. The proof token can later be used by the efficient prover (who does not know a witness) to convince the verifier exactly once that the input x is in the language. The witness owner and the verifier are assumed to be "honest" and follow the prescribed protocols, whereas the prover may be malicious and deviate arbitrarily.

In a one-time proof, the prover convinces the verifier by means of a standard interactive proof system. In particular, the verifier doesn't need physical access to the proof token (only the prover needs this access). After running the interactive proof and convincing the (honest) verifier once, the proof token becomes useless and cannot be used again. The point is that (i) the witness owner does not need to be involved in the proof, beyond supplying the token (hence the proof system is off-line), and (ii) the prover, even though it convinces the verifier, learns nothing from interacting with the hardware, and in particular cannot convince the verifier a second time. Thus, for any N P statement, one-time proofs allow a witness owner to give other parties the capability to prove the statement in a controlled manner, without revealing to them the witness. A one-time proof system gives this "one-time proof" guarantee, as well as the more standard completeness and soundness guarantees, and a zero knowledge guarantee, stating that anything that can be learned from the proof token, can be learned without it (by a simulator). Finally, a user who wants to use the one-time proof token to convince himself that x∈L can do so without any interaction by running the interactive proof in his head (in this case the prover and verifier are the same entity).

Note that a prover who somehow does know a witness to x's membership can convince the verifier as many times as it wants. The one-time proof captures this requirement do this by requiring that any prover who can use a single proof token to convince the verifier more than once, must in fact know a witness to x's membership in the language. Formally, the witness can be extracted from the prover in polynomial time. In particular, this means that if the prover can convince the verifier more than once using a single proof token, then the prover could also convince the verifier as many times as it wanted without ever seeing a proof token! In other words, the proof token does not help the prover prove the statement more than once.

Another natural setting where one-time proofs come up is in voting systems, where the goal is to ensure that voters can only vote once. In this setting, each voter will be given a one-time proof for possessing the right to vote (of course, one must also ensure that the proof tokens cannot be transferred from one voter to another). A similar application of one-time proofs is for electronic subway tokens. Here the subway operator wants to sell electronic subway tokens to passengers, where the tokens should be verifiable by the subway station turnstiles. A passenger should only be able to use a token once to gain entrance to the subway, and after this the token becomes useless. This goal is easily realized in a natural way by one-time proofs. The subway operator generates a hard cryptographic instance, say a product n=p·q of two primes. Subway tokens are one-time proof tokens for proving that n is in fact a product of two large primes. The passengers play the role of the prover. The turnstiles are the verifier, and only let provers who can prove to them that n is a product of two primes into the subway station. Any passenger who can use a single token to gain entrance more than once, can also be used to find a witness, or the factorization of n, a task which we assume is impossible for efficient passengers.

More generally, one can view one-time proofs as a natural generalization of count-limited access control problems. In particular, we can convert any 3-round ID scheme (or any Σ-protocol) can be converted into a one-time proof of identity.

One-time proofs are different from non-interactive zero knowledge (NIZK) proofs. In both cases, the witness owner need not be present when the proof is being verified. However, in NIZK proof systems either the proof can be verified by arbitrary verifiers an unlimited number of times, and in particular is also not deniable (for example, NIZK proof systems in a CRS-like model), or the proofs have to be tailored to a specific verifier and are useless to other verifiers (for example, NIZK proof systems in the pre-processing model). One-time zero knowledge proofs, on the other hand, can only be verified once, but by any user, and are later deniable. They also do not need a trusted setup, public-key infrastructure, or pre-processing, but on the other hand they do use secure hardware.

Any N P statement has an efficient one-time proof using OTMs. To attain small soundness problems that arise in the parallel composition of zero-knowledge proof (but in a non-interactive setting) need to be overcome. This is accomplished by using the secure hardware to allow a delicate simulation argument. While the general-purpose one-time compiler from the previous section can be used to construct a one-time proof, this results in considerably less efficient (and less intuitively appealing) schemes.

Let κ be a security parameter and k a soundness parameter. Assume that there exists a one-way permutation on κ-bit inputs. Every NP language L has a one-time zero-knowledge proof with perfect completeness and soundness $2^{-k}$. The proof token uses k OTMs (each of size poly(n, k, κ), where n is the input length).

A one-time proof is constructed for the NP complete language Graph Hamiltonicity, from which one can derive a one-time proof for any NP language. The input is a graph G=(V, E), the producer has a witness w describing a hamiltonian cycle in the graph. The one-time proof uses k OTMs to get a proof with soundness $2^{-k}$ (and perfect completeness).

The basic idea of a zero-knowledge proof is for a prover to commit to a random permutation of the graph and send this commitment to the verifier. The verifier can then ask the prover whether to send it the permutation and all the de-commitments (openings of all the commitments), or to send de-commitments to a Hamiltonian cycle in the permuted graph. The proof is zero-knowledge, with soundness ½.

A natural approach for our setting is for the witness owner to generate a proof token that has the committed permuted graph as a software component. The proof token also includes an OTM whose first secret is the permutation and all the de-commitments and whose second secret is decommitments to a Hamiltonian cycle in the permuted graph (the answer to the second verifier query). This indeed gives a (simple) one-time proof with soundness ½ via standard arguments: the only thing a prover can learn from the token is one of the two possible de-commitment sequences, and we know that the prover could generate this on its own. On the other hand, somewhat paradoxically, this proof token does allow a prover to convince a verifier that the graph has a Hamiltonian cycle in an interactive proof with perfect completeness and soundness ½.

To amplify the soundness to $2^{-k}$, a seemingly effective idea is to have the producer produce k such committed graphs and k such corresponding OTMs, each containing a pair of secrets corresponding to a new commitment to a random permutation of its graph. This idea is, however, problematic. The difficulty is that simulating the one-time proof becomes as hard as simulating parallel executions of Blum's zero-knowledge protocol. Namely, whoever gets the OTMs can choose which of the two secrets in each OTM it will retrieve as a function of all of the committed permuted graphs. In the standard interactive zero-knowledge proof setting this is resolved by adding interaction to the proof. However, in our setting it is crucial to avoid adding interaction with the witness owner during the interactive proof phase, and thus known solutions do not apply. In general, reducing the soundness without adding interaction is a long-standing open problem. In our setting, however, we can use the secure hardware to obtain a simple solution.

To overcome the above problem, the secure hardware (OTMs) are used to "force" a user who wants to gain anything from the proof token, to access the boxes in sequential order, independently of upcoming boxes, as follows. The first committed graph $C_1$ is given to the user "in the clear", but subsequent committed graphs, Ci, i≥2, are not revealed until all of the prior i−1 OTMs (corresponding to committed graphs $C_1, \ldots, C_{i-1}$) have been accessed. This is achieved by, for each i: (1) splitting the description of the i-th committed graph $C_i$ into i−1 random strings $m_i^1, \ldots m_i^{i-1}$ (or shares) such that their XOR is $C_i$; and (2) letting the j-th ROK output $m_i^j$ for each i≥j+1 as soon as the user accesses it (regardless of which input the user gives to the OTM). Thus by the time the user sees all shares of a committed graph, he has already accessed all the previous OTMs corresponding to the previous committed graphs. The user (information theoretically) does not know the i-th committed graph until he has accessed all the OTMs 1, . . . , i−1, and this forces "sequential" behavior that can be simulated. Of course, after accessing the boxes 1, . . . , i−1, the user can retrieve the committed graph and verify the proof's correctness as usual (i.e. completeness holds). See the full version for a formal theorem statement and proof.

Fully homomorphic encryption can be used to construct one-time programs with small size and hardware running time. A construction of one-time programs with small size and running time implies secure-function-evaluation protocols with sub-linear (in the computation size) communication complexity.

We begin by outlining how fully homomorphic encryption can be used to construct one-time programs with small size and hardware running time. A homomorphic encryption scheme is used that supports computations from a class F of Turing machines. I.e., given encryptions of n inputs bits $x_1, \ldots, x_n$, bits describing a Turing machine T∈F and the public key, it is possible to compute an encryption of T(x) (where $x=x_1 \bigcirc \ldots \bigcirc x_n$). It is assumed that the ciphertext size is poly($\kappa$) and that the time required to compute the encrypted output is poly($t_T(n)$, $\kappa$). Note that it is not required that the homomorphic operations be hiding (e.g. the encryption of T(x) may contain information about T and x).

Assume that there exists a fully homomorphic encryption scheme for a class F of functions. There exists an efficient one-time compiler C that for input length n uses n OTMs: $\beta_1, \ldots, \beta_{poly(\kappa)}$. For any (non-uniform) Turing machine T∈F, with worst-case running time $t_T(n)$ (on inputs of length n), the compiler C, on input $1^n$, $1^{t_T(n)}$, description of T and security parameter $1^{K(n)}$, outputs a one-time program $P \triangleq M^{\beta_1(v_1), \ldots, \beta_{poly(\kappa)}(v_n)}$ such that P(x)=T(x) for inputs of length n. Let $t_T(x)$ denote T's running time on input x∈$\{0, 1\}^n$. Then, P(x) achieves: latency O(1); hardware runtime poly ($\kappa$); total running time poly ($t_T(x)$, $\kappa$, n); and size O(n·poly ($\kappa$)).

The one-time program includes an encryption of the bits of the Turing machine T and the public key for the fully homomorphic scheme. To run it on an input x, the user encrypts each of the bits of x and uses the homomorphic evaluation to compute an encryption of T(x). The initial idea is that the one-time program supports one-time decryption (using the general-purpose compiler above) and so a user can use it to recover T(x). The work required for one-time decryption is small, polynomial only in the security parameter $\kappa$.

This idea on its own fails, because a malicious user could use the one-time decryptor to decrypt other ciphertexts (ones not generated by evaluating T on an input x). In particular, he could decrypt some bit of the encrypted machine T and recover non-black box information. To circumvent this, we will force the user to prove that the ciphertext he wants to decrypt was generated in a valid manner. This will be done using computationally sound proofs of knowledge. Described below is the full construction as an interactive protocol between the user and the one-time program. Between rounds in this protocol, the program's state is maintained by the user, reliability and secrecy are ensured using digital signatures and (secret key) encryption. The protocol proceeds in rounds:

1. The one-time program publishes the homomorphic encryption's public key and the encrypted bits of T.
2. The user chooses an input x and computes the encryption cipher of T(x) using homomorphic evaluation.
3. The user and the one-time program run an interactive computationally sound proof of knowledge by which the user proves that he knows an input x such that cipher is an encryption of T(x). Note that the work required by the one-time program here is only poly ($\kappa$) and the latency (number of rounds) is constant.
4. The one-time program decrypts cipher, the user recovers T(x). Note that this is a one-time decryption only.

The key point here is that the user indeed must know the input x s.t. cipher is an encryption of T(x). This allows simulation and one-time secrecy. The simulator feeds the user a dummy encryption of say the 0 string, extracts the user's chosen input x (via the extractor for the proof of knowledge) and returns T(x) to the user. This transcript is indistinguishable from the one generated using an encryption of the real program T because of the encryption scheme's semantic security.

To allow interaction between the user and the (stateless) one-time program, a separate one-time program is generated for each round of interaction, internal state is passed between these separate programs (from the output of one program to the input of the next). To ensure the user/adversary does not learn hidden information about the program's internal state and cannot modify it a (secret key) encryption and signatures (MACs) are used.

Finally, it is noted that more generally any efficient protocol for secure function evaluation can be transformed to give efficient constructions of one-time programs. I.e., if a protocol that can be used by Alice, who has machine T, and Bob, who has input x, so that Bob recovers T(x) without learning anything more about x, then an efficient one-time program is obtained. The work and size of the one-time program is proportional to Alice's work in the protocol. The idea is simply for the one-time program to run Alice's part of the protocol. Again, several stateless one-time programs are used to do this, and ensure reliability and privacy when passing state between them by using signatures and encryption (secret key primitives suffice).

Assume that for every security parameter $\kappa$, there exists a secure oblivious transfer protocol for 1-bit message pairs with communication complexity poly($\kappa$). Fix any input length n and any (non-uniform) Turing machine T. Suppose P is a one-time program corresponding to T (for inputs of length n). If P is of total size s(n) and the worst-case (combined) running time of the secure hardware(s) on an n-bit input is t(n), then there exists a secure function evaluation protocol where Alice has input T, Bob has input $x \in \{0, 1\}^n$, at the end of the protocol Bob learns T(x) but nothing else, Alice learns nothing, and the total communication complexity is $s(n)+O(t(n) \cdot poly(\kappa))$.

Solutions achieving the best of both worlds in light of this theorem will now be examined. Suppose there exists a one-time compiler that transforms any program T into a one-time program with simple secure hardware that does $O(n*\kappa)$ work and has total size $O(|T|+\kappa)$. By the above theorem, this would immediately give a secure function evaluation protocol where Alice has T, Bob has x, Bob learns only T(x) and Alice learns nothing, with linear in (n, |T|, $\kappa$) communication complexity. Constructing such protocols is a central problem in theoretical cryptography. For example, this is one of the main motivations for constructing a fully homomorphic encryption scheme. We conclude that achieving the best of both worlds is a highly non-trivial task, which is (informally) tightly connected to fully homomorphic encryption (see more below).

One-time programs have immediate applications to software protection. They also enable new applications such as one-time proofs, discussed below. Finally, OTMs and one-time programs can be used to construct electronic cash and electronic token schemes.

Regarding software protection, by the very virtue of being one-time programs, they cannot be reverse engineered, copied, re-distributed or executed more than once. One way to provide software protection is by limiting the number of executions. A vendor can put an explicit restriction as to the number of times a program it sells can be used, by converting it into a one-time program which can be executed for at most k times. For example, this allows vendors to supply prospective clients with "preview" versions of software that can only be used a very limited number of times. Unlike techniques that are commonly employed in practice, here there is a guarantee that the software cannot be reverse engineered, and the component that limits the number of executions cannot be removed. Moreover, the present invention does not require trusting a system clock or communicating with the software over a network (as do many solutions employed in practice). This enables vendors to control (and perhaps charge for) the way in which users use their software, while completely maintaining the user's privacy (since the vendors never see users interacting with the programs). One-time programs naturally give solutions to such copy protection and software protection problems, albeit at a price (in terms of complexity and distribution difficulty).

As a natural application for one-time programs, consider the following setting, referred to herein as temporary transfer of cryptographic ability. Alice wants to go on vacation for the month of September. While she is away, she would like to give her assistant Bob the power to decrypt and sign Emails dated "September 2008" (and only those E-mails). Alice can now supply Bob with many one-time programs for signing and decrypting messages dated "September 2008". In October, when Alice returns, she is guaranteed that Bob will not be able to decrypt or sign any of her messages. As long as Alice knows a (reasonable) upper bound for the number of expected messages to be signed and decrypted, temporarily transferring her cryptographic ability to Bob becomes easy.

A related goal to the goal of one-time computing is that of time-limited computing. Here a program is created that can only be run a pre-specified number of times within a certain date and time range. E.g. the program can be run three times between January 1st and 7th, but is completely useless outside this date range. This can be used to generate guaranteed trial versions of software that expire at a pre-specified date. One-time programs can be used to attain this goal in the presence of a secure system clock (the secure clock is clearly essential to attaining the time-limited computing goal).

For example, one can model a tamper-proof clock that can receives an input message, combines it with the current time into a single new message, and outputs a digital signature on the new message. To create a time-limited program, one can generate a one-time program that receives an input and time, together with the clock's signature on the input-time pair. If the signature is valid, and the date is in the program's specified date range, then the one-time program computes a function on the input and outputs it. Otherwise, the one-time program returns NULL.

Referring now to FIG. 1, a block diagram illustrating example architecture of a computer system 110 that executes, runs, interprets, operates or otherwise performs a one-time program application 140-1 and one-time program process 140-2 suitable for use in explaining example configurations disclosed herein is shown. The computer system 110 may be any type of computerized device such as a personal computer, workstation, portable computing device, console, laptop, network terminal or the like. An input device 116 (e.g., one or more customer/developer controlled devices such as a keyboard, mouse, etc.) couples to processor 113 through I/O interface 114, and enables a customer 108 to provide input commands, and generally control the graphical customer interface 160 that the one-time program application 140-1 and process 140-2 provides on the display 130. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network (not shown), such as secure hardware device 120.

The memory system 112 is any type of computer readable medium, and in this example, is encoded with a one-time program application 140-1 as explained herein. The one-time program application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of a one-time program application 140-1. Execution of a one-time program application 140-1 in this manner produces processing functionality in the one-time program process 140-2. In other words, the one-time program process 140-2 represents one or more portions or runtime instances of a one-time program application 140-1 (or the entire one-time program application 140-1) performing or executing within or upon the processor 113 in the computerized device 110 at runtime.

It is noted that example configurations disclosed herein include the one-time program application 140-1 itself (i.e., in the form of un-executed or non-performing logic instructions and/or data). The one-time program application 140-1 may be stored on a computer readable medium (such as a floppy disk), hard disk, electronic, magnetic, optical, or other computer readable medium. A one-time program application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of a one-time program application 140-1 in the processor 113 as the one-time program process 140-2. Those skilled in the art will understand that the computer system 110 may include other processes and/or software and hardware components, such as an operating system not shown in this example.

A display 130 need not be coupled directly to computer system 110. For example, the one-time program application 140-1 can be executed on a remotely accessible computerized device via the network interface 115. In this instance, the graphical customer interface 160 may be displayed locally to a customer 108 of the remote computer, and execution of the processing herein may be client-server based.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

Figure 2A:
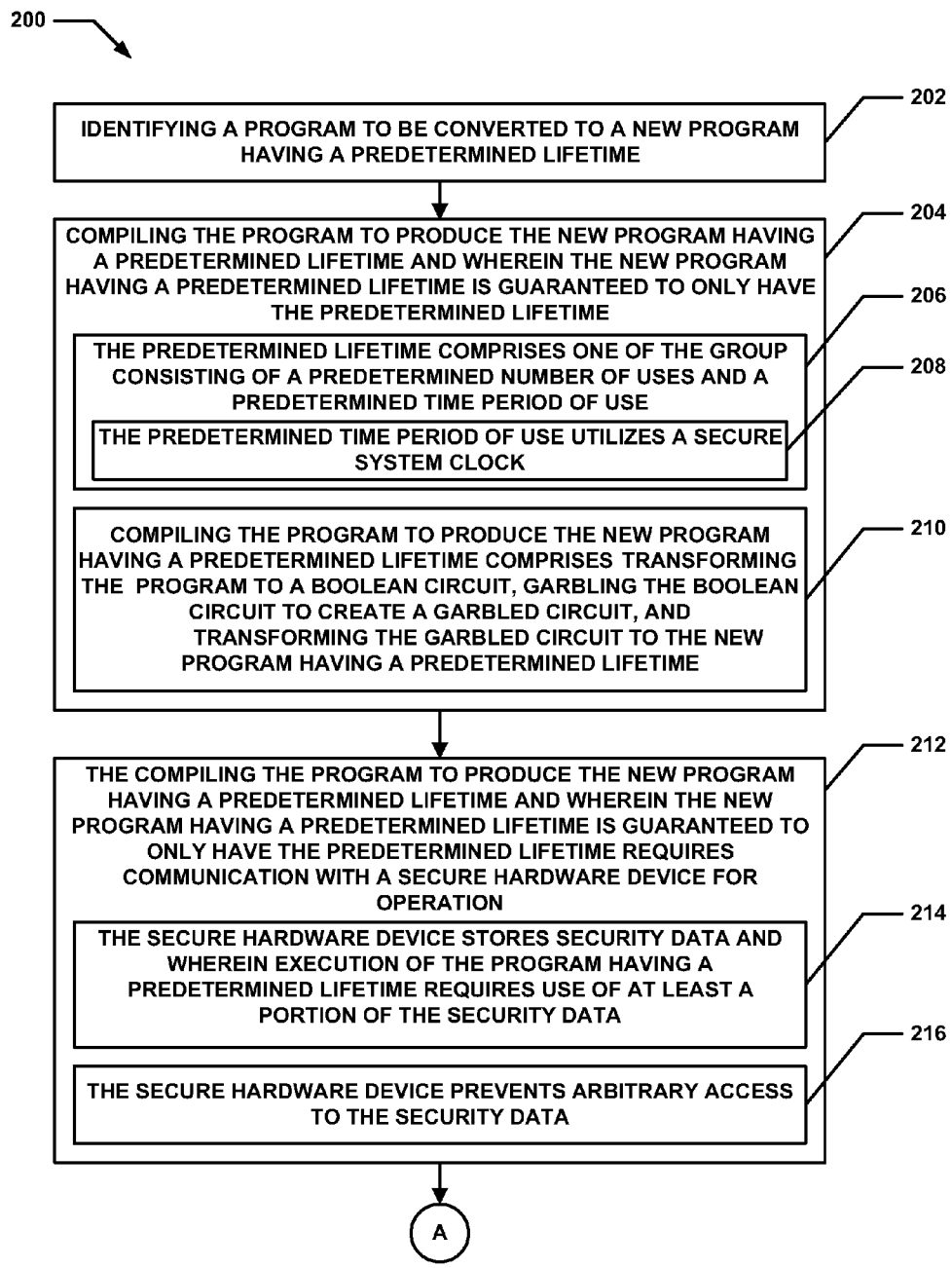
FIGS. 2A and 2B depict a flow diagram of a particular embodiment of a method of providing a program having a predetermined lifetime in accordance with embodiments of the invention.
Figure 2B:
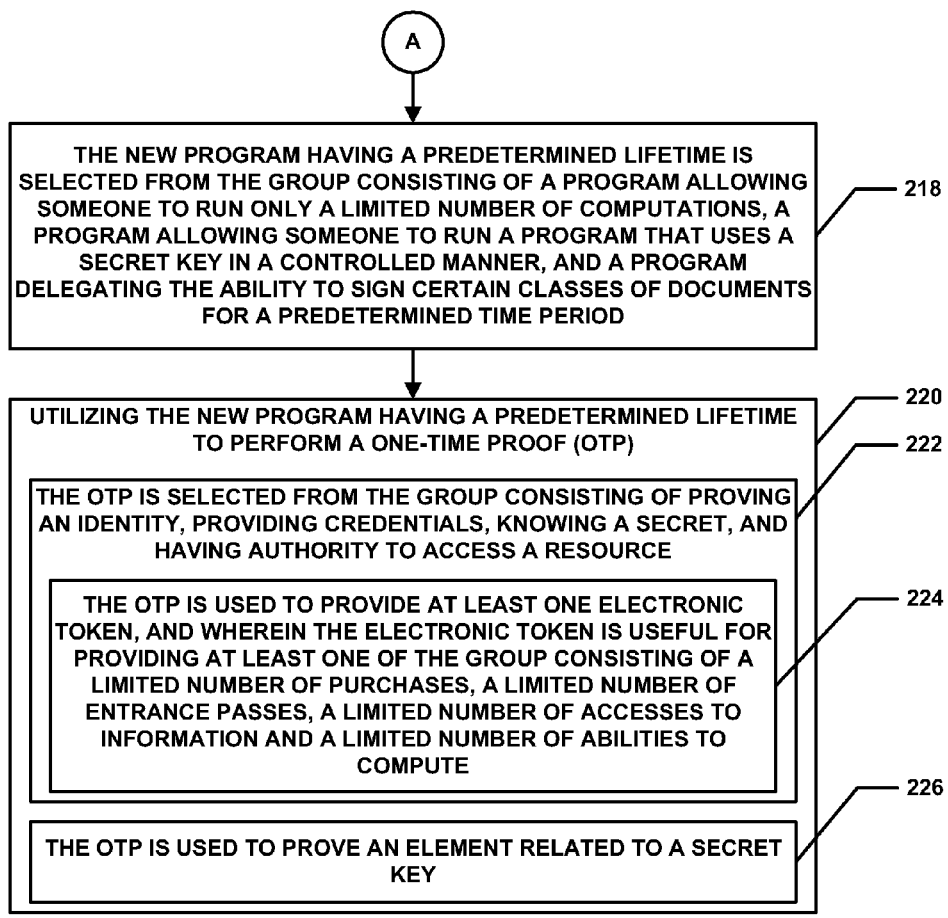
Figure 3:
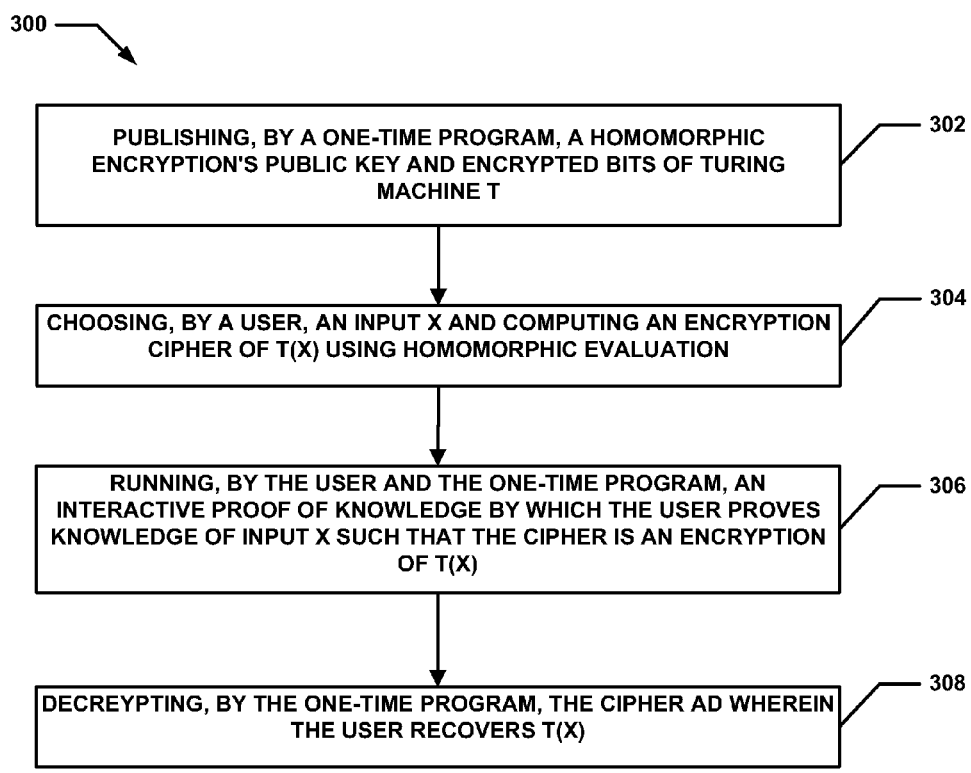
FIG. 3 depicts a flow diagram of a particular embodiment of a method of using homomorphic encryption with a program having a predetermined lifetime in accordance with embodiments of the invention.

Flow diagrams of the presently disclosed methods are depicted in FIGS. 2A, 2B and 3. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 2A and 2B, a particular embodiment of a method 200 providing a program having a predetermined lifetime is shown. Method 200 begins with processing block 202 which discloses identifying a program to be converted to a new program having a predetermined lifetime.

Processing block 204 states compiling the program to produce the new program having a predetermined lifetime and wherein the new program having a predetermined lifetime is guaranteed to only have the predetermined lifetime. As shown in processing block 206 the predetermined lifetime comprises one of the group consisting of a predetermined number of uses and a predetermined time period of use. As further shown in processing block 208 the predetermined time period of use utilizes a secure system clock. Processing block 210 recites the compiling the program to produce the new program having a predetermined lifetime comprises transforming the program to a Boolean circuit, garbling the Boolean circuit to create a garbled circuit, and transforming the garbled circuit to the new program having a predetermined lifetime.

Processing block 212 discloses wherein the compiling the program to produce the new program having a predetermined lifetime and wherein the new program having a predetermined lifetime is guaranteed to only have the predetermined lifetime requires communication with a secure hardware device for operation. As shown in processing block 214 the secure hardware device stores security data and wherein execution of the program having a predetermined lifetime requires use of at least a portion of the security data. As further shown in processing block 216 the secure hardware device prevents arbitrary access to the security data.

Processing continues with processing block 218 which states the new program having a predetermined lifetime is selected from the group consisting of a program allowing someone to run only a limited number of computations, a program allowing someone to run a program that uses a secret key in a controlled manner, and a program delegating the ability to sign certain classes of documents for a predetermined time period.

Processing block 220 discloses utilizing the new program having a predetermined lifetime to perform a one-time proof (OTP). As shown in processing block 222, the OTP is selected from the group consisting of proving an identity, providing credentials, knowing a secret, and having authority to access a resource. Processing block 224 states the OTP is used to provide at least one electronic token, and wherein the electronic token is useful for providing at least one of the group consisting of a limited number of purchases, a limited number of entrance passes, a limited number of accesses to information and a limited number of abilities to compute. Processing block 226 recites the OTP is used to prove an element related to a secret key Referring now to FIG. 3, a particular embodiment of a computer-implemented method 300 for using homomorphic encryption with a one-time program is shown. Method 300 begins with processing block 302 which discloses publishing, by a one-time program, a homomorphic encryption's public key and encrypted bits of Turing machine T. Processing block 304 states choosing, by a user, an input x and computing an encryption cipher of T(x) using homomorphic evaluation.

Processing block 306 states running, by the user and the one-time program, an interactive proof of knowledge by which the user proves knowledge of input x such that the cipher is an encryption of T(x). Processing block 308 recites decrypting, by the one-time program, the cipher ad wherein the user recovers T(x).

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method in which a computer system performs operations comprising:
   identifying a program to be converted to a new program having a predetermined lifetime; and
   compiling, by said computer system in communication with a secure hardware device wherein said secure hardware device comprises a One-Time Memory (OTM), said OTM initialized with two keys $k_0$ and $k_1$ and a tamper proof bit set to a value of zero, wherein said OTM receives an input bit b, verifies said tamper proof bit is zero, sets said tamper proof bit to a 1, and outputs a key $k_b$ based on said two keys and said input bit, said program to produce said new program having a predetermined lifetime and wherein said new program having a predetermined lifetime is guaranteed to only have the predetermined lifetime and wherein said predetermined lifetime comprises a predetermined number of uses and wherein said program is executed at most k times, wherein k is equal to or greater than one,
   wherein said secure hardware device stores security data and wherein execution of said program having a predetermined lifetime requires use of at least a portion of said security data.

2. The method of claim 1 wherein said secure hardware device prevents arbitrary access to said security data.

3. The method of claim 1 further comprising utilizing said new program having a predetermined lifetime to perform a one-time proof (OTP), wherein said OTP comprises a system with a predetermined lifetime that allows proving a validity of a statement.

4. The method of claim 3 wherein said OTP is selected from the group consisting of proving an identity, providing credentials, knowing a secret, and having authority to access a resource.

5. The method of claim 3 wherein said OTP is used to provide at least one electronic token.

6. The method of claim 5, wherein said electronic token is useful for providing at least one of the group consisting of a limited number of purchases, a limited number of entrance passes, a limited number of accesses to information and a limited number of abilities to compute.

7. The method of claim 1 wherein said new program having a predetermined lifetime is selected from the group consisting of a program allowing someone to run only a limited number of computations, a program allowing someone to run a program that uses a secret key in a controlled manner, and a program delegating the ability produce digital signatures in a controlled manner.

8. The method of claim 1 wherein said new program having a predetermined lifetime is used as an electronic blank check that are issued and later used to sign a document.

9. The method of claim 3 wherein said OTP is used to prove a statement related to a secret key.

10. The method of claim 2 wherein said secure hardware device utilizes tamper proof bits to prevent access to other keys.

11. The method of claim 10 wherein said secure hardware device prevents side channel attacks.

12. The method of claim 1 wherein side channel security is achieved by using data a limited number of times.

13. The method of claim 1 wherein adversaries are restricted to side channel attacks and can only make observations on events that are influenced by data the device computed on.

14. The method of claim 1 wherein said security data on said hardware device is encrypted.

15. The method of claim 14 wherein another device is used to decrypt said security data.

16. The method of claim 1 wherein said secure hardware device is accessed over a network.

17. The method of claim 1 wherein after said device outputs the key $k_b$ said device self-destructs.

18. A non-transitory computer readable storage medium having computer readable code thereon for providing a program having a predetermined lifetime, the medium including instructions in which a computer system performs operations comprising-implemented method in which a computer system performs operations comprising:
   identifying a program to be converted to a new program having a predetermined lifetime; and
   compiling said program by said computer system in communication with a secure hardware device wherein said secure hardware device comprises a One-Time Memory (OTM), said OTM initialized with two keys $k_0$ and $k_1$ and a tamper proof bit set to a value of zero, wherein said OTM receives an input bit b, verifies said tamper proof bit is zero, sets said tamper proof bit to a 1, and outputs a key $k_b$ based on said two keys and said input bit, to produce said new program having a predetermined lifetime and wherein said new program having a predetermined lifetime is guaranteed to only have the predetermined lifetime and wherein said predetermined lifetime comprises a predetermined number of uses and wherein said program is executed at most k times, wherein k is equal to or greater than one, wherein said secure hardware device stores security data and wherein execution of said program having a predetermined lifetime requires use of at least a portion of said security data.

19. The computer readable storage medium of claim 18 wherein said secure hardware device prevents arbitrary access to said security data.

20. The computer readable storage medium of claim 18 further comprising utilizing said new program having a predetermined lifetime to perform a one-time proof (OTP), wherein said OTP comprises a system with a predetermined lifetime that allows proving a validity of a statement.

21. The computer readable storage medium of claim 20 wherein said OTP is selected from the group consisting of proving an identity, providing credentials, knowing a secret, and having authority to access a resource.

22. The computer readable storage medium of claim 20 wherein said OTP is used to provide at least one electronic token.

23. The computer readable storage medium of claim 22, wherein said electronic token is useful for providing at least one of the group consisting of a limited number of purchases, a limited number of entrance passes, a limited number of accesses to information and a limited number of abilities to compute.

24. The computer readable storage medium of claim 18 wherein said new program having a predetermined lifetime is selected from the group consisting of a program allowing someone to run only a limited number of computations, a program allowing someone to run a program that uses a secret key in a controlled manner, and a program delegating the ability produce digital signatures in a controlled manner.

25. The computer readable storage medium of claim 18 wherein said new program having a predetermined lifetime is used as an electronic blank check that are issued and later used to sign a document.

26. The computer readable storage medium of claim 20 wherein said OTP is used to prove a statement related to a secret key.

27. The computer readable storage medium of claim 19 wherein said secure hardware device utilizes tamper proof bits to prevent access to other keys.

28. The computer readable storage medium of claim 27 wherein said secure hardware device prevents side channel attacks.

29. The computer readable storage medium of claim 18 wherein side channel security is achieved by using data a limited number of times.

30. The computer readable storage medium of claim 18 wherein adversaries are restricted to side channel attacks and can only make observations on events that are influenced by data the device computed on.

31. The computer readable storage medium of claim 18 wherein said security data on said hardware device is encrypted.

32. The computer readable storage medium of claim 31 wherein another device is used to decrypt said security data.

33. The computer readable storage medium of claim 18 wherein said secure hardware device is accessed over a network.

34. The computer readable medium of claim 18 further comprising instructions wherein after said device outputs the key $k_b$, said device self-destructs.

35. A computer system comprising:
a memory;
a processor;
a communications interface;
an interconnection mechanism coupling the memory, the processor and the communications interface; and
wherein the memory is encoded with an application providing a program having a predetermined lifetime, that when performed on the processor, provides a process for processing information, the process causing the computer system to perform the operations of:
identifying a program to be converted to a new program having a predetermined lifetime; and
compiling said program by said computer system in communication with a secure hardware device wherein said secure hardware device comprises a One-Time Memory (OTM), said OTM initialized with two keys $k_0$ and $k_1$ and a tamper proof bit set to a value of zero, wherein said OTM receives an input bit b, verifies said tamper proof bit is zero, sets said tamper proof bit to a 1, and outputs a key $k_b$ based on said two keys and said input bit, to produce said new program having a predetermined lifetime and wherein said new program having a predetermined lifetime is guaranteed to only have the predetermined lifetime and wherein said predetermined lifetime comprises a predetermined number of uses and wherein said program is executed at most k times, wherein k is equal to or greater than one,
wherein said secure hardware device stores security data and wherein execution of said program having a predetermined lifetime requires use of at least a portion of said security data.

36. The computer system of claim 35 wherein said secure hardware device prevents arbitrary access to said security data.

37. The computer system of claim 35 further comprising utilizing said new program having a predetermined lifetime to perform a one-time proof (OTP), wherein said OTP comprises a system with a predetermined lifetime that allows proving a validity of a statement.

38. The computer system of claim 37 wherein said OTP is selected from the group consisting of proving an identity, providing credentials, knowing a secret, and having authority to access a resource.

39. The computer system of claim 37 wherein said OTP is used to provide at least one electronic token.

40. The computer system of claim 39, wherein said electronic token is useful for providing at least one of the group consisting of a limited number of purchases, a limited number of entrance passes, a limited number of accesses to information and a limited number of abilities to compute.

41. The computer system of claim 35 wherein said new program having a predetermined lifetime is selected from the group consisting of a program allowing someone to run only a limited number of computations, a program allowing someone to run a program that uses a secret key in a controlled manner, and a program delegating the ability produce digital signatures in a controlled manner.

42. The computer system of claim 35 wherein said new program having a predetermined lifetime is used as an electronic blank check that are issued and later used to sign a document.

43. The computer system of claim 37 wherein said OTP is used to prove a statement related to a secret key.

44. The computer system of claim 36 wherein said secure hardware device utilizes tamper proof bits to prevent access to other keys.

45. The computer system of claim 44 wherein said secure hardware device prevents side channel attacks.

46. The computer system of claim 35 wherein side channel security is achieved by using data a limited number of times.

47. The computer system of claim 35 wherein adversaries are restricted to side channel attacks and can only make observations on events that are influenced by data the device computed on.

48. The computer system of claim 35 wherein said security data on said hardware device is encrypted.

49. The computer system of claim 48 wherein another device is used to decrypt said security data.

50. The computer system of claim 35 wherein said secure hardware device is accessed over a network.

51. The computer system of claim 35 wherein after said device outputs the key $k_b$ said device self-destructs.

* * * * *